Figure 2:
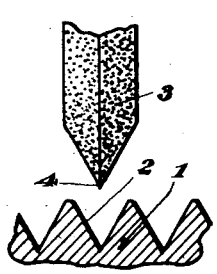

Jan. 24, 1939. F. P. MILLER 2,144,987

METHOD FOR MAKING CUTTER BLADES

Filed Aug. 20, 1936

Inventor
FRANK P. MILLER

By E. F. Salter
Attorney

Patented Jan. 24, 1939

2,144,987

UNITED STATES PATENT OFFICE 2,144,987

METHOD FOR MAKING CUTTER BLADES

Frank P. Miller, Meadville, Pa.

Application August 26, 1936, Serial No. 97,076

2 Claims. (Cl. 51—278)

This invention relates to a method for making serrated blades for inserted blade cutters, the present application being a continuation in part of my application Serial No. 50,584, filed November 19, 1935.

The use of serrated blades in cutter heads of various types is common practice throughout the metal cutting industries. However, the forming of these serrations presents certain serious difficulties in manufacture and gives rise to problems which it is the province of the present invention to solve.

In making serrated blades from tool steels, including the various grades of high speed steel, it is customary to form the serrations with a hob when the blades are in an annealed condition, after which it is, of course, necessary to subject the blades to the usual heat treatment at high temperatures to produce the required hardness. This heat treatment results in a certain amount of warpage, distortion and scaling which prevents the blade serrations from having a perfect bearing on the mating slot serrations in the cutter head or body. It is, therefore, very desirable that the serrations be formed after the hardening operation.

As stated in the aforementioned parent application, where the serrations in the blade are as numerous as those of the body with which they interfit, they are so closely juxtaposed as to require a grinding wheel with a definitely thin and tapering V-shaped grinding portion, inherently fragile and necessitating slow careful feeding into the work, with frequent interruptions in grinding for the purpose of redressing the wheel. Furthermore, when the V-shaped serrations are so close together, it is necessary to grind one at a time, since it is commercially impracticable to maintain an accurate contour on the grinding surface of the wheel consisting of closely juxtaposed sharp V-grooves and ridges, which in many cases are so fine in cross-section as to result in thirty-two ridges and thirty-two grooves in one inch, each groove and each ridge having a sharp point that must be maintained at all times.

It is obvious that in making serrated blades from non-machineable metal such as Stellite, tungsten carbide, etc., there is no choice as to method and the serrations must be formed by a grinding wheel, regardless of the cost of doing so.

My parent application above referred to describes a new form of serrated blade which reduces by one-half the number of serrations to be formed and also makes possible a new, simple and inexpensive method of grinding the serrations, which method is the subject of this application. Cutter blades produced by this method are more efficient because the serrations are perfectly true and accurate, are free from distortion and scaling and fit perfectly the serrations in the body. This is essential if the blades are to withstand the pressures of heavy cuts without yielding. A blade that yields ever so slightly will soon lose its cutting edge and will not produce accurate work. A further result of this invention resides in the fact that serrated blades can be made by this method at almost as low a cost as plain blades without serrations. The total result is a superior product at a greatly reduced cost of manufacture.

With an appreciation of the foregoing, another object of the invention is the method of grinding the blade serrations with a grinding wheel having a flat surface or land equal in width to not less than the base of one serration, the groove thus formed between blade serrations being sufficient to embrace two or more serrations in the cutter head.

A further object of the invention is the provision of a grinding wheel having the grinding surface contoured to produce the blade serrations as described which, by virtue of the obtuse supporting angles between the sides of the wheel and the land, is durable and long-lived, requiring dressing only at protracted intervals, permitting higher speed in operation, with the result of accelerated output.

Other objects of the invention will appear as the following description of a preferred and practical embodiment thereof proceeds.

Figure 1:
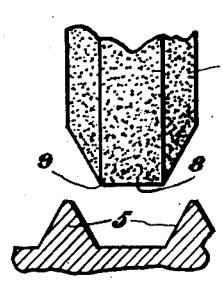
Figure 3:
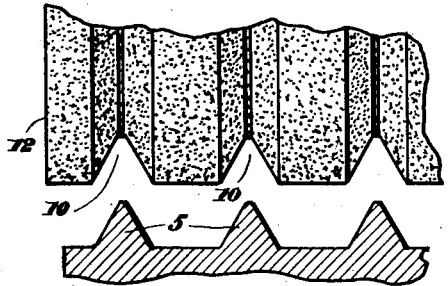
Figure 4:
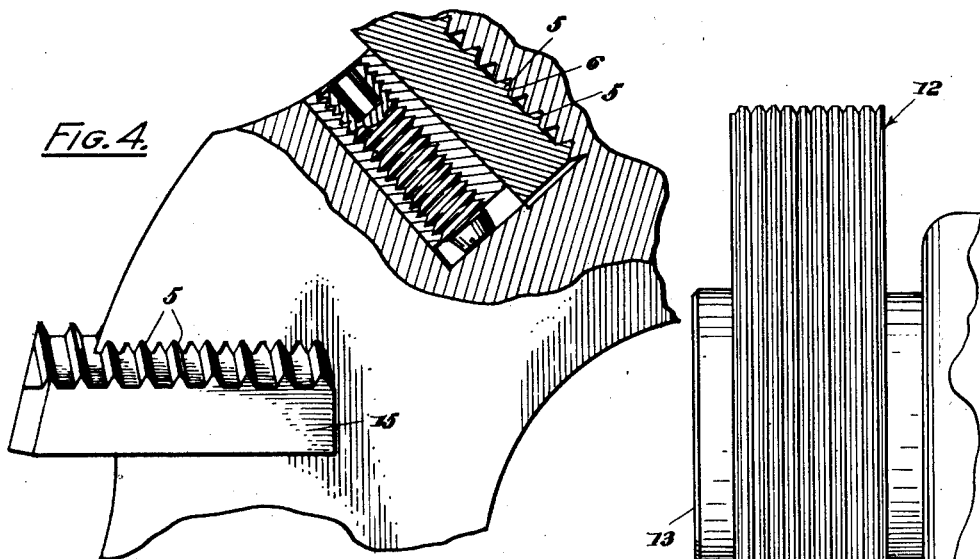
Figure 5:
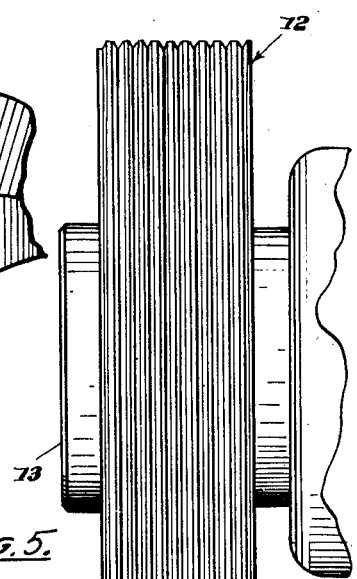
Figure 6:
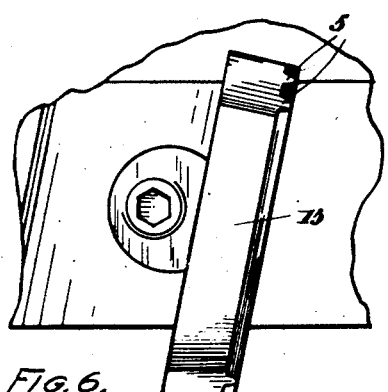
Figure 7:
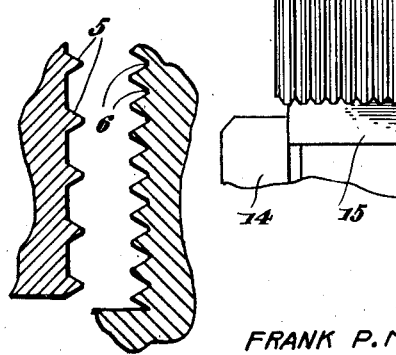

In the accompanying drawing forming a part of this application and in which like numerals are employed to designate like parts throughout the same, Figures 1 and 2 contrast the new with the old, Figure 1 being a fragmentary section of a blade embodying the principles of the present invention, showing also, in fragmentary elevation, the grinding wheel by which this form of blade is produced, Figure 2 is a similar view of a blade and grinding wheel of known construction, Figure 3 is a view similar to Figures 1 and 2 showing a grinding wheel capable of making a plurality of serrations at one time, Figure 4 is a view partly in section and partly in elevation showing a cutter head with inserted blade made according to the present invention, Figure 5 is a view in elevation showing a grinding wheel of considerable width in grinding contact with a blade held in the jaws of a vise, Figure 6 is a fragmentary plan view of a cutter head having mounted therein a blade made according to the present invention, Figure 7 is a fragmentary cross-section of juxtaposed blade and body serrations, illustrating the difference between blade and body serrations and their ability to mate with each other with the same results as though both serrated surfaces were alike.

Referring now in detail to the several figures, the numeral 1 represents a blade of "Stellite" or the like or hardened tool steel having a plurality of close serrations 2. The grinding wheel 3 for making these serrations is shown to have a V-shaped periphery with an acute apex 4. This is a shape that breaks down readily under the stress of grinding, with the result that it is frequently necessary to interrupt production for the purpose of redressing the grinding wheel. Further, the shape of the grinding portion of the wheel 3 has a definitely limiting effect on the allowed speeds and feeds so that rapid production is further interfered with.

In Figure 1, which illustrates the present invention, the serrations 5 are spaced apart double the width of a serration so that the serrations 5 of the blade 15 fit in every other groove 6 in the blade receiving recess in the cutter head. See Figure 4.

In providing for generous spaces between the serrations 5 of the blade, I am able to use a grinding wheel 7 having a broad land 8, as distinguished from the thin and tapering grinding periphery of the wheel 3 in Figure 2, the land 8 being flanked on both sides by obtuse shoulders or supporting angles 9. It is obvious that the wide land 8 will hold its shape much longer than the sharp apex 4 of the wheel shown in Figure 2 and can be fed into the work more rapidly. This overcomes the need of frequent redressing of the grinding wheel and allows the use of the heavier feeds and more rapid speeds that are so necessary to accelerated production. Furthermore, it is apparent that only one-half as many serrations have to be ground in the blade as compared with the usual form of serrated blade illustrated in Figure 2.

Fig. 3 represents a still further advance in the method of producing serrated blades, and is merely an extension of the idea shown in Fig. 1. The grinding wheel 12 shown in Fig. 3 is formed with a plurality of grooves 10 for producing several of the serrations 5 at one time. This wheel may be integral or comprise a group of thin grinding wheels clamped together. It is obvious to anyone skilled in the grinding art that there is no serious difficulty in making a V-shaped groove such as the grooves 10 in Fig. 3, and that a V-shaped groove will retain its shape over a much longer period than a V-shaped point or projection as shown in Fig. 2.

In the case of a groove, the grinding pressure comes mostly on the sides of the groove and the point at the bottom of the groove is well supported at both sides. In the case of a V-point, as shown on the wheel in Fig. 2, the first point of contact is the acute point itself, and this is not supported on either side and thus quickly breaks down.

As shown in Figure 5, the grinding wheel 12 is mounted on a driven shaft 13 of any good design of surface grinding machine having a reciprocating table to carry the blades back and forth under the wheel and, of course, in engagement therewith for forming the serrations therein. The blade 15 may be held securely in place between the jaws 14 of a vise or other holding means associated with the table.

Figures 4, 6 and 7 show clearly how reducing the number of serrations in the blade does not interfere at all with the fineness of adjustment of the blade relative to the serrations of the body, for it is the number of serrations of the body that determines the step by step advance of the blade 15 relative to the body.

Having thus described the invention, what is claimed is:

1. The method of forming parallel adjustment serrations in a hard or hardened cutter blade for cooperation with a greater number of serrations on a blade holder, comprising bringing one side of the blade into contact with a rotating abrasive wheel having upon its periphery a blunt elevation, said elevation having inclined sides to shape the inclined sides of the blade serrations, and said elevation being of a cross-sectional area equal to the combined cross-sectional area of a plurality of the serrations to be formed on the cutter blade, maintaining the blade in contact with the wheel, and effecting relative movement between the blade and wheel transversely of the wheel axis to form in the blade the inclined side faces of adjacent serrations and an intervening groove of sufficient width to receive a plurality of holder serrations.

2. The method of forming parallel adjustment serrations in a hard or hardened cutter blade for cooperation with a greater number of serrations on a blade holder, comprising bringing one side of the blade into contact with a rotating abrasive wheel having upon its periphery a plurality of alternate annular elevations and grooves, each elevation being of a cross-sectional area equal to the combined cross-sectional area of a plurality of said grooves, maintaining the blade in contact with the wheel, and at the same time effecting relative movement between the blade and wheel transversely of the wheel axis to simultaneously form in the blade a plurality of parallel serrations spaced apart sufficiently to receive between each pair thereof a plurality of holder serrations.

FRANK P. MILLER.